Nov. 8, 1938. J. MILLER 2,136,055
MEANS AND METHOD FOR MEASURING TEMPERATURES
Filed Nov. 27, 1936
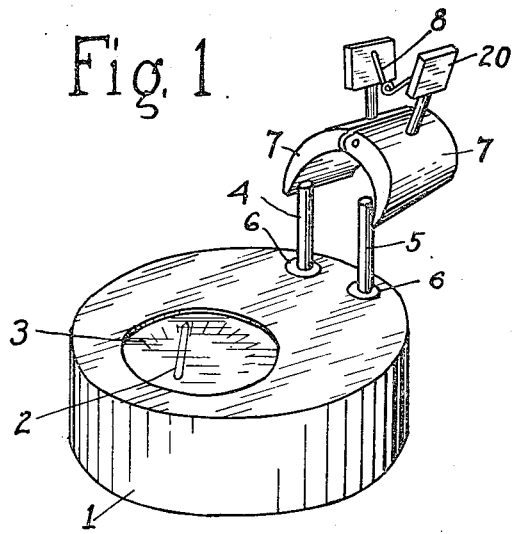
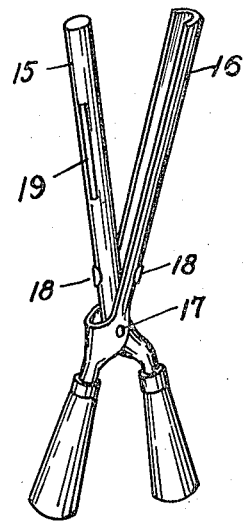
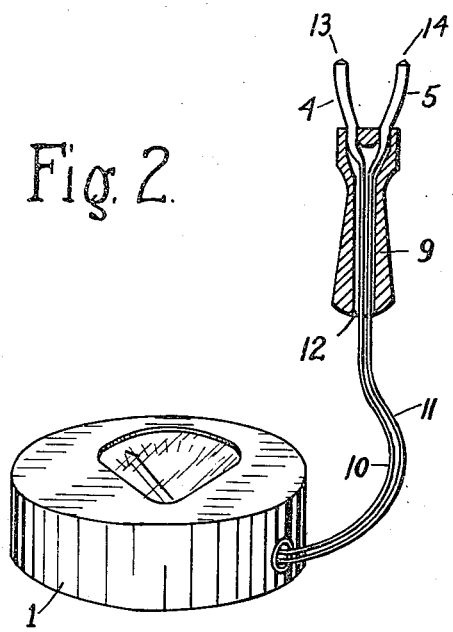
JOHN MILLER. INVENTOR.
BY *Jacob D Levit*
ATTORNEY.

Patented Nov. 8, 1938

2,136,055

UNITED STATES PATENT OFFICE 2,136,055

MEANS AND METHOD FOR MEASURING TEMPERATURES

John Miller, New York, N. Y.

Application November 27, 1936, Serial No. 113,090

4 Claims. (Cl. 73—359)

This invention relates in general to means and methods for measuring temperatures based on the thermo-couple principle, and in particular to means and methods for measuring temperatures of hair clamps, curling irons, and the like, as applied in the hair dressing industry.

In dressing hair to produce permanent waves, waves, curls and ringlets, such as on the human head, the application of heat is a very essential step in the process. The temperature of this heat, on application to the hair, is very important; that is, in order to insure the best results, as judged by the uniformity, permanency, and texture of the finished job, there are certain critical temperatures beyond or below which an inferior quality of hair dressing results. The temperatures of the heat applications range from 200 degrees Fahrenheit to 800 degrees Fahrenheit. Just what is the critical temperature depends among other things, in each particular case, upon the texture of the hair, the type of lotions and wrappers applied, and the kind and style of hair dressing desired.

Heat may be supplied to the hair in one or more of several ways: by the application of preheated irons, curling irons, or clamps which have been heated in ovens, or over gas or electric stoves; by the application of irons, clamps, or other heat transfer devices containing electric heating elements within themselves, and the heat is generated by an electric current while the devices are attached to the hair; or by exothermic chemical reactions.

Heretofore, except in the case of exothermic chemical reactions where the exothermic qualities may be definitely arranged by laboratory tests, there has been no dependable method or device available which would indicate quickly and with relative accuracy the temperature of a heat-transfer medium (as these clamps may be called) just before its application to the hair. Too much has depended upon the judgment and skill of a human operator.

Some operators judge the temperature of a heat-transfer device by placing it close to some sensitive part of their body. It used to be a custom for an operator to apply liquid, often sputum, to the heat-transfer medium and to judge the temperature by the sizzle. Scorching of paper as an indicator of temperature is a common practice. Many hair dressers use a clock in connection with the primary heating device; they have learned from experience that within a certain time the heat-transfer medium will be raised to the required temperature, altho what that temperature is they do not know. Attempts have been made to regulate the temperature of the primary heating devices by thermostats, but most thermostats are sluggish in their action, and where a primary heater heats a gang of clamps or irons, there is no assurance that all of these heat-transfer media have been raised to the same temperature, especially if these media were placed on the primary heater not all at the same time.

As a rule the mercury thermometer, and thermometers of that sort in general, are entirely too sluggish in responding to temperature changes to be of any use for these purposes.

I have attempted to use commercial pyrometers of the thermo-couple type as temperature indicators of heat-transfer mediums, but found them also too sluggish for my purposes. When an aluminum clamp, raised to 600 degrees Fahrenheit was placed against the exposed, welded tip of a thermo-couple, the galvanometer would take almost a minute before it stopped climbing the scale of temperatures. In a minute interval the clamp loses considerable heat. In some cases I have determined this loss to be as much as 150 degrees—a loss that can not be tolerated in a commercial establishment. Besides, in that interval of time, the thermo-couple elements will absorb heat to a point where often they are higher in temperature than the clamp which is subsequently to be measured. This condition leads to inaccuracies.

It is the general broad object of this invention to provide a means and a method whereby the temperature of objects can be determined quickly and with relative accuracy.

Another object of this invention is to provide a means for quickly ascertaining the temperatures of heat-transfer mediums.

It is still another object to provide a means and method for accurately measuring and controlling temperatures in the application of heating devices in the dressing of hair.

One of the features of this invention lies in the novel construction of a thermo-couple, and the means employed to close the electric circuit therein.

Another feature of the invention resides in the method of equipping an object, whose temperature is to be measured, with means to cooperate with a thermo-electric-couple, so that its temperature may be quickly measured.

Additional objects and features of the invention will become apparent from the following specifications and the accompanying drawing, in which:

Fig. 1 is a commercial form of galvanometer and thermo-couple combination, with the thermo-couple elements exposed and spaced apart, and a metallic clamp across said elements to close the circuit.

Fig. 2 is a galvanometer housing with leads to a portable thermo-couple.

Fig. 3 is a hair curling iron equipped for cooperation with spaced thermo-couple elements.

It is well known that when two metallic substances are joined together at one end and the free ends of each are connected to a terminal of a galvanometer so that a closed electric circuit contains, then if the temperature of the joined ends is raised, an electro-motive-force is generated which is proportional to the difference in temperature between the joined and free ends of the metallic materials. This is the principle of the thermo-couple as applied to, and in, pyrometry.

I have found that when the two metallic substances forming the thermo-couple are not joined, but the thing whose temperature is to be measured is placed across the two said elements to close the circuit, a galvanometer in series in the circuit will have a quicker response to the electro-motive-force generated.

Referring to Fig. 1: The housing 1 contains a galvanometer (not shown) which operates the indicator hand 2 in the dial face 3. Within the housing 1, one terminal of the galvanometer is connected to the metallic rod 4, which in this case may be of iron, and the other terminal of the galvanometer is connected to the metallic rod 5, which in this case may be of constantan. Rods 4 and 5 protrude thru the housing 1 thru the insulating ferrules 6, 6, to form the metallic elements of the thermo-couple. It will be noted that rods 4 and 5 are not in direct contact with each other. This is the construction of the new type of pyrometer embodying my invention.

Now in order to measure the temperature of a preheated hair curling clamp made of metal it is only necessary to place the clamp across the rods 4 and 5 to close the electric circuit and read the temperature on the calibrated dial 3 as indicated by the hand 2.

Altho the drawing shows the thermo-couple and galvanometer as an independently complete unit, commercially I intend to incorporate it into a clamp heating cabinet; that is, the galvanometer and its dial face will be built into the cabinet and the couple elements will protrude therefrom so that the primary heaters of the hair curling devices, the primary heater controls, and my temperature measuring device may be had as one compact unit. It will be possible also to have the spaced couple-elements rigidly fixed to the heating cabinet, but to have the galvanometer and its dial positioned somewhere else so that its E. M. F. temperature reactions may be visible to the person whose hair is being dressed at the time. I believe such an arrangement will make excellent advertising to create customer good will.

In Fig. 1, 20 is a hair curler clamp with oppositely positioned heat-transfer elements 7, 7 made of aluminum. The spring 8 urges the elements 7, 7 together. The clamp 20 is placed across the rods 4 and 5 so that elements 7, 7 exert pressure on them. It will be found that pressure is desirable for better electrical contact. In fact with aluminum clamps here described, the response of the galvanometer can be considered for all practical purposes instantaneous.

In Fig. 2 is shown a portable type of my pyrometer in which the metallic rods 4 and 5 are carried by a handle 9, shown in cross-section, of non-conducting material, and the leads 10 and 11 from the rods to the galvanometer terminals in housing 1 pass thru the channel 12 in the said handle.

It will be noticed that the ends 13 and 14 of the rods 4 and 5 are pointed so that they may be impressed into a metallic body for better electrical contact. With this portable arrangement it is possible to measure the temperatures of things in inaccessable places (provided of course, that the thing to be measured is a conductor of electricity). It should be noticed also that the rods 4 and 5 are not parallel to each other but diverge from their setting. This makes it possible to wedge metallic objects between them for better electrical contacts.

It will be found that my pyrometer gives very quick and substantially accurate results in indicating the temperatures of the softer metals, such as lead, zinc, and aluminum. However, with the harder metals, unless certain precautions are taken, the effectiveness of my construction and method over that of the conventional type of thermo-couple in which the thermo-couple elements are welded together, decreases. In Fig. 3 is indicated a method of overcoming this loss in efficiency.

In Figure 3 is shown a curling iron. In each steel tong 15 and 16, close to the pivot point 17 is embedded a bead of soft metal 18. To measure the temperature of the curling iron it is merely necessary to place it between rods 4 and 5 of my pyrometer in such a manner that upon expanding the tongs 15 and 16 the beads 18 come into contact with, and close the circuit of, the thermo-couple. The iron becomes a necessary part of the circuit.

The device in Fig. 3 points the way to measure, with my pyrometer, the temperatures of non-conducting or high-resistance substances: A strip of soft metal 19 is attached to the iron in Fig. 3. The metal strip, naturally, will take on the same temperature as its host. The temperature of the host will be indicated by the pyrometer by pressing rods 4 and 5 against the metal strip 19 so that the electric circuit will be closed.

Still another variation on the method of temperature measurement explained in conjunction with Fig. 3 and in the preceding paragraph is as follows: In Fig. 3 is shown a hair curling device whose tongs 15 and 16 are coated with a soft metallic paint, such as aluminum. To measure the temperature of the tongs, place the coated surface in contact across the rods 4 and 5 of the thermo-couple shown in Fig. 1.

The construction of my temperature indicating device and the methods of its application will be readily understood from the foregoing description, and it will be seen that I have provided a simple, inexpensive and efficient means for carrying out the objects of my invention. Furthermore, while I have particularly described the elements best adapted to perform the functions set forth, especially as applied to the hairdressing industry, it is obvious that their application is not limited to that industry, and that various changes in form, proportion, and in minor details of construction may be resorted to without departing from the spirit or sacrificing any of the principles of the invention.

What I claim is:

1. A method of testing the temperature of a solid object comprising: attaching an electricity conducting body to the object so that the said body takes on the temperature of its host; positioning the object across the separated electrodes of a thermo-couple so that the said body electrically connects the electrodes; and measuring the thermo-electric current generated.

2. A method of testing the temperature of a solid object comprising: attaching two metallic beads to the object; positioning the object across the separated electrodes of a thermo-couple, the said beads serving as contact points, and allowing the thermo-electric current generated to flow thru the object to electrically connect the two electrodes; and measuring the thermo-electric current generated.

3. A method of testing the temperature of a solid object comprising: coating said object with a metallic veneer; positioning the object across the separated electrodes of a thermo-couple, the said veneer serving to electrically connect the said electrodes; and measuring the thermo-electric current generated.

4. An apparatus for measuring the temperature of hair treating devices and the like comprising: a housing forming a supporting base, spaced thermo-couple elements of a thermo-couple projecting from said housing in position to be contacted by the heating devices, and current indicating means mounted within said housing and electrically connected with said elements; said housing offering sufficient anchorage so as not to be readily displaced during the engagement of said elements with the treating devices when the latter is applied thereto under pressure.

JOHN MILLER.